Patented Dec. 26, 1950

2,535,361

UNITED STATES PATENT OFFICE 2,535,361

STABILIZED THERMOPLASTIC CELLULOSE ETHER COMPOSITION

William Koch, Wilmington, Del., and George H. Pyle, Hopewell, Va., assignors to Hercules Powder Company, Wilmington, Del., a corporation of Delaware No Drawing. Application September 25, 1948, Serial No. 51,323

10 Claims. (Cl. 106—176)

This invention relates to the stabilization of cellulose ethers and, more particularly, to the production of cellulose ethers and their compositions which retain their viscosity and good color during and after exposure to heat, light, oxidation, weathering and other degrading influences.

Cellulose ether compositions and particularly ethyl cellulose compositions have found considerable usefulness where the properties of toughness, dimensional stability and flexibility at extremely low temperatures are desirable. However, when subjected to elevated temperatures, prolonged exposure to ultraviolet light or aging in general, there has been a discoloration and/or viscosity degradation which has limited their usefulness to a considerable extent. Thus, compositions depositing a colorless mass from solution have given relatively dark amber masses much like tortoise shell upon being molded at temperatures of the order of 200–300° C. In addition, there has been considerable loss of viscosity, i. e., degradation, leading to brittle molded products. Similar discoloration and loss of viscosity, strength, and flexibility also result from prolonged storage or exposure to ultraviolet light and weathering. The problem of stabilization is particularly difficult where relatively high heats are required, as in fast molding, or when the material is exposed for prolonged periods to severe weathering conditions.

In the past, viscosity stabilization has been effected to some extent by the addition of certain amines and certain phenolic bodies. In most cases these have tended to add color themselves or have contributed to the formation of color in the cellulose ether. In the few cases where color development has been less than that obtained where no stabilizers were used, the extent of color improvement has been insufficient and has been obtained largely under moderate, rather than high, heat conditions.

Some attempts have been made to improve color by treatment with bleaching agents and by treatment with acids. Where such improvements in color have been retained in the molding operation, they have resulted in such extreme loss of viscosity that a relatively useless molded product results. Even mildly bleaching, slightly acidic agents, such as sulfur dioxide, have been found to cause crazing, scorched dark spots, brittleness; i. e., local or general degradation at molding temperatures of 200° C., and above, either immediately or on normal aging. As a result, it has not been possible to prepare clear, colorless, molded ethyl cellulose articles or even to prepare molded ethyl cellulose articles in pale or pastel shades. Ethyl cellulose molded articles have, therefore, been made only in pigmented or dark colors.

Now, in accordance with this invention, it has been found that ethyl cellulose and other thermoplastic cellulose ethers and their compositions may be effectively stabilized against discoloration and viscosity degradation, when exposed to heat and weathering, by adding to or incorporating with the cellulose ether a small amount of di-sec-amylphenol, alone or in combination with a sulfur dioxide-producing compound. When used alone, the di-sec-amylphenol exerts a very definite stabilizing effect on cellulose ethers and their compositions, protecting them from discoloration and degradation when exposed to heat, light, air, weathering and other degrading influences. Optimum results are obtained, however, when the di-sec-amylphenol is used in combination with small amounts of a sulfur dioxide-producing compound. Thus, in accordance with this invention, cellulose ethers and their compositions may be molded at elevated temperatures such as 200° C. and above to form tough, shaped articles very greatly improved in color after molding as compared with previous molded compositions of this nature. As a result it is now possible to successfully prepare clear, relatively colorless moldings and moldings in light and pastel shades.

In view of the acidic nature of sulfur dioxide and in view of the fact that phenolic bodies are, in general, of an acidic rather than basic nature, it is surprising and unexpected that the use of di-sec-amylphenol alone or in combination with sulfur dioxide in cellulose ether compositions at molding temperatures brings about formation of tough, undegraded products of improved color. Heretofore, it has been the experience in this field that acids caused severe degradation, sometimes accompanied by discoloration, when cellulose ethers were exposed to heat or aged. Furthermore, although considerable improvement in stability characteristics and particularly color are obtained by the use of di-sec-amylphenol alone, it has been found that optimum stability improvement is obtained when di-sec-amylphenol and a sulfur dioxide-releasing compound are used in combination.

The invention will be illustrated by the examples of preparation of molding compositions and preparation of molded articles therefrom which follow. All parts and percentages given are by weight.

EXAMPLE 1

Ethyl cellulose having 46.8% to 48.5% ethoxyl content and 100 cps. viscosity was dissolved in 80:20 toluene:alcohol. Di-sec-amylphenol was added to a portion of the solution to give a composition containing 1% di-sec-amylphenol, based on the weight of the ethyl cellulose. The di-sec-amylphenol used in this example, and in all of the succeeding examples has the secondary amyl groups substituted in the ortho and para positions relative to the hydroxyl group. Films about 3 mils in thickness were then cast from the composition, and portions of the films thus formed were heated for 48 hours at 120° C. in air. Films of the ethyl cellulose containing no stabilizer were also heated under the same conditions. Viscosities of the samples before and after heat treatment were determined and from these figures the viscosity retention was obtained. Flexibility and discoloration were also noted. Table I below compares the results obtained with the stabilized and unstabilized ethyl cellulose.

TABLE I

*Evaluation of di-sec-amylphenol as stabilizer for ethyl cellulose after heating for 48 hours at 120° C. in air*

| Sample | Flexibility | Discoloration | Per Cent Viscosity Retention |
|---|---|---|---|
| Unstabilized | Flexible | Very Slight | 27.3 |
| di-sec-Amylphenol (1%) | do | Nil | 71.9 |

These data illustrate that a small amount of di-sec-amylphenol in an ethyl cellulose film which is heated for 48 hours at 120° C. in air effectively stabilizes the ethyl cellulose with respect to both color and viscosity retention.

Portions of these samples were also exposed to ultra-violet light in a Fade-Ometer machine for 50 hours. Flexibility, discoloration and per cent viscosity retention were determined as before and are set forth in Table II below.

TABLE II

*Evaluation of di-sec-amylphenol as stabilizer for ethyl cellulose after exposure in the Fade-Ometer for 50 hours*

| Sample | Flexibility | Discoloration | Per Cent Viscosity Retention |
|---|---|---|---|
| Unstabilized | Brittle | Nil | 5.4 |
| di-sec-Amylphenol (1%) | Flexible | Nil | 59.0 |

These data illustrate that a small amount of di-sec-amylphenol in an ethyl cellulose film which is exposed 50 hours in the Fade-Ometer effectively stabilizes the ethyl cellulose with respect to both film flexibility and viscosity retention.

EXAMPLE 2

The following ingredients were colloided on a two-roll mill at 290–310° F. for 20 minutes, dried, chipped into a molding powder, and molded into discs at 400° F. for 10 minutes.

|  | Parts |
|---|---|
| Ethyl cellulose (44.5 to 45.5% ethoxyl, 100 cps. viscosity) | 85 |
| Dibutyl phthalate | 15 |

Similar compositions were prepared and molded containing (1) 2% di-sec-amylphenol, (2) 0.3% butadiene sulfone, and (3) 2% di-sec-amylphenol and 0.3% butadiene sulfone.

All samples were exposed to the S-1 sun lamp-fog box cycle (2 hours in the fog chamber, 2 hours irradiation under the S-1 lamp, 2 hours in the fog chamber, 18 hours irradiation) for 120 hours. Color of discs after molding and color and condition of discs after exposure to S-1 sun lamp-fog box cycle were determined and are set forth in Tables III and IV below. Colors were measured on the spectrophotometer, and values are expressed as luminous transmittance and as the red trichromatic coefficient. The former value represents the amount of light that each disc will transmit, and the red coefficient represents the per cent of red in the total color value of the sample.

TABLE III

*Color of discs after molding (spectrophotometer)*

| Sample | Luminous Transmittance, Per Cent | Trichromatic Coefficient (Red) |
|---|---|---|
| Unstabilized | 2.0 | .6139 |
| 2% di-sec-Amylphenol | 22.0 | .4803 |
| 0.3% Butadiene sulfone | 12.1 | .5289 |
| 2% di-sec-Amylphenol and 0.3% butadiene sulfone | 32.4 | .4348 |

TABLE IV

*Color and condition of discs after exposure to S-1 sun lamp-fog box cycle (spectrophotometer color values)*

| Sample | Luminous Transmittance, Per Cent | Trichromatic Coefficient (Red) | Condition |
|---|---|---|---|
| Unstabilized | 1.9 | .6017 | Surface badly crystallized and disintegrating. |
| 2% di-sec-Amylphenol | 24.1 | .4262 | Fine surface craze. |
| 0.3% Butadiene sulfone | 14.8 | .4962 | Surface badly crystallized and disintegrating. |
| 2% di-sec-Amylphenol and 0.3% Butadiene sulfone | 32.6 | .4038 | Fine surface craze. |

A higher percentage value for luminous transmittance in the tabulated data signifies better clarity with more total light being transmitted through the sample than a lower value signifies. A lower value for the red trichromatic coefficient in the tabulated data signifies less red in the total color value of the sample and therefore a more nearly colorless sample. Thus, these data illustrate that ethyl cellulose plastic discs containing a small amount of di-sec-amylphenol alone or in combination with butadiene sulfone transmit a great deal more light and show much better resistance to discoloration than an unstabilized ethyl cellulose plastic disc, both immediately after molding and after exposure for 120 hours to the S—1 sun lamp-fog box cycle. Furthermore, the surface condition of ethyl cellulose plastic discs containing a small amount of di-sec-amylphenol alone or in combination with butadiene sulfone was in much better condition than either the unstabilized ethyl cellulose disc or the ethyl cellulose disc containing butadiene sulfone alone. The surface of the ethyl cellulose discs which did not contain any di-sec-amylphenol was badly crystallized and disintegrating in contrast to a fine crazing without surface disintegration or crystallization for the ethyl cellulose discs containing a small amount of di-sec-amylphenol.

EXAMPLE 3

To 175 grams of flake ethyl cellulose containing 0.35% by weight of butadiene sulfone was added 62 grams of dibutyl phthalate and 7 grams of di-sec-amylphenol, and the mixture was placed on a two-roll mill with the rolls at 310°±10° F. With the mill running, an additional 175 grams of the same flake ethyl cellulose was added and the material was milled at 300° to 320° F. for 15 minutes. The composition was then stripped from the rolls as a well-colloided plastic sheet, broken into pieces, and ground to about 8 mesh with an Abbé cutter. Exactly 200 grams of this molding powder was placed in a glass-top quart jar with the top in place but not sealed. The jar and its contents were heated for 16 hours at 100° C. in an oven. From this molding powder a plastic disc 2¼ inches in diameter and 0.065 inch thick was compression molded in a conventional ring and plug mold, employing 5 grams of molding powder and molding at 2000 lb. p. s. i. at 200° C. for 5 minutes.

A similar molding powder and molded disc were prepared by the same procedure from the same flake ethyl cellulose but without any di-sec-amylphenol.

Viscosity measurements were then made on the original flake ethyl cellulose, on the molded disc of ethyl cellulose plastic composition containing di-sec-amylphenol and on the molded disc of ethyl cellulose plastic composition without the di-sec-amylphenol. Viscosity values for the molded plastic compositions were corrected for plasticizer content in order to place all viscosities on a comparable basis with the viscosity of the original flake ethyl cellulose as the reference standard.

Viscosities were measured at 25° C.±0.1° C. on 5% by weight solutions of the original flake ethyl cellulose and of the molded plastic compositions in a solvent composed of 80 parts toluene and 20 parts denatured ethyl alcohol by weight. Viscosity values are given in Table V below.

TABLE V

*Evaluation of di-sec-amylphenol as stabilizer for ethyl cellulose after high temperature milling and molding operations*

| Sample | Viscosity (Centipoises) |
|---|---|
| Original Flake Ethyl Cellulose[1] Containing 0.35% Butadiene Sulfone by weight | 71 |
| Ethyl Cellulose[1] Containing 0.35% Butadiene Sulfone by weight in Molded Disc | 12.4 |
| Ethyl Cellulose[1] Containing 0.35% Butadiene Sulfone by weight plus 2% by weight of di-sec-Amylphenol in Molded Disc | 72.4 |

[1] 46.4% ethoxyl content.

These data illustrate that a small amount of di-sec-amylphenol in an ethyl cellulose plastic composition which is subjected to high temperature milling and molding operations effectively stabilizes the ethyl cellulose with respect to viscosity retention.

The method and compositions of this invention call for use of cellulose ethers of the thermoplastic type and of sufficient degree of polymerization to yield tough, molded articles. In general, cellulose ethers soluble in any of the common organic solvents, such as acetone, benzene, toluene-alcohol, methanol, ethanol, ethyl acetate, butyl acetate, and the like, are of the required thermoplastic type. Ethyl cellulose having an ethoxyl content between about 37% and about 52%, preferably between about 43% and about 48% and having a viscosity of at least about 20 cps., is particularly suitable. However, thermoplastic propyl cellulose, ethyl propyl cellulose, ethyl butyl cellulose, methyl ethyl cellulose, and benzyl cellulose are likewise useful in molding compositions, and, like ethyl cellulose, their molding compositions are very greatly improved in color of the molded product by proceeding in accordance with this invention. It is desirable that the cellulose ethers be so prepared or purified as to eliminate any substantial proportion of free acid. Thus, treatment with strong acids should be avoided unless there is subsequent neutralization of any free acid groups by basic ions, such as sodium, calcium, magnesium, cesium, copper, and the like.

The stabilizers according to the present invention may be incorporated before, during or after preparation of the cellulose ether compositions or while the cellulose ether compositions are being molded or otherwise formed into finished plastic articles. For example, when di-sec-amylphenol alone is used, the cellulose ether may be dissolved in a suitable solvent to which the di-sec-amylphenol is added, after which solvent is removed. Alternatively, the cellulose ether may be suspended in water or a swelling medium, such as aqueous alcohol and a solution of the stabilizer added to the suspension for absorption by the cellulose ether. Again the stabilizer may be added during a tumbling, stirring, or other similar operation for distributing the stabilizer through the granular cellulose ether. Incorporation of the stabilizer at some stage of manufacture is desirable, since it frequently happens that the cellulose ether is stored for considerable periods before use, and the presence of an effective stabilizer prevents any substantial degradation due to aging.

The stabilizer may also be incorporated during preparation of the product in which the cellulose ether is eventually employed. For example, in the preparation of cellulose ether lacquers, molding powders, etc., the stabilizer may be added to the finished lacquer or to the lacquer solvent during or prior to dissolving the other lacquer ingredients; to the mixture of ingredients prior to or during formation of a molding powder, etc.

The amount of di-sec-amylphenol utilized may vary from about 0.5% to about 5.0% of the weight of the cellulose ether. Preferably, it is employed in amounts between about 1% and about 3%, 1% usually being the optimum quantity to obtain satisfactory stability and other required characteristics. Larger amounts than about 5% produce no substantial additional stabilizing effect, while amounts below about 0.5% usually do not create the desired degree of stabilization.

When sulfur dioxide is included substantially similar amounts of di-sec-amylphenol will be utilized in order to obtain maximum stability characteristics. Sulfur dioxide may be provided as such at the time of molding the cellulose ether composition containing the di-sec-amylphenol, by passing a small stream of sulfur dioxide into the molding chamber or into a chamber or hopper by which the thermoplastic composition is led to the molding chamber. A similar result is obtained by subjecting a molding powder of the cellulose ether composition to an atmosphere of sulfur dioxide, whereby it absorbs some of the sulfur dioxide, and then molding the composition by compression, injection, or extrusion under heat before the absorbed sulfur dioxide has been lost.

Usually it is more convenient to incorporate in the molding composition a compound which will decompose at the molding temperature to form sulfur dioxide, and di-sec-amylphenol, and then molding the composition under heat. Temperatures utilized in molding will be at least sufficient to cause release of sulfur dioxide from the particular compound used. Generally these will be of the order of about 200° C., although temperatures above or below this figure may be used. By this method, a small amount of sulfur dioxide is released under the heat of the molding operation. Thus, there is provided a thermoplastic cellulose ether molding composition containing both the compound capable of releasing sulfur dioxide and the di-sec-amylphenol. Such a composition is capable of being molded to strong, tough articles which may be of pale color or a pastel shade or of very greatly reduced color in the case of clear articles.

The sulfur dioxide-releasing compound may be incorporated in the cellulose ether at the time it is manufactured, or it may be incorporated during the preparation of the molding composition. Either of the latter procedures has the advantage of providing the cellulose ether with a color protective influence during the milling needed to form a molding powder.

Any compound which is substantially colorless, which does not discolor under heat, and which does not in itself function as an acid stronger than sulfurous acid is suitable. The sulfones of aliphatic compounds, such as those derived from butadiene, piperylene, isoprene, 2-methyl pentadiene, amyldiene, or other diene hydrocarbons, are particularly useful since they release sulfur dioxide freely at 200° C. without leaving any appreciable residue. Polypropylene sulfone, polyalkyl-polysulfones generally, and cyclic dipropylene sulfone are effective. Aliphatic sulfonates provide another group of compounds which, in most cases, give off sulfur dioxide at 200° C.; such sulfonates as sodium sulfodiethyl succinate, sodium sulfodipropyl succinate, sodium sulfodibutyl succinate, sodium sulfodiamyl succinate, sodium sulfodihexyl succinate, sodium sulfodioctyl succinate, sodium sulfodilauryl succinate, equivalent potassium compounds, and similar derivatives of substituted succinates, have been found particularly suitable since the residue is quite compatible in the cellulose ether compositions and, in fact, functions as a plasticizer. These compounds may be prepared by condensation of sodium bisulfite with the corresponding esters of maleic acid. Any aliphatic or alicyclic sulfonate which will release sulfur dioxide upon heating is suitable. Alkyl and other organic sulfites, for example, dimethyl sulfite, diethyl sulfite, dibutyl sulfite, methyl bisulfite, ethyl bisulfite, acetone bisulfite, normal-heptaldehyde bisulfite, and sodium formaldehyde sulfoxylate, were found to function by release of sulfur dioxide at 200° C. Inorganic compounds, such as sodium bisulfite, sodium meta-bisulfite, potassium bisulfite, calcium bisulfite, sodium hydrosulfite, and the like, which are capable of releasing sulfur dioxide upon heating at 200° C. have also been found suitable. The inorganic materials are of use in pale pigmented molding compositions but tend to add haze to compositions intended for clear moldings.

The quantity of sulfur dioxide or sulfur dioxide-releasing material will, in general, be quite small but may vary considerably with the particular compound utilized. It is most easily expressed on the basis of the content of sulfur dioxide in free or combined form, and, on this basis, at least about 0.005% by weight of sulfur dioxide based upon the cellulose ether in the molding composition should be present during the molding operation in order to obtain improvement in color of the molded article. Preferably, a quantity between about 0.05% and about 0.5% of sulfur dioxide based on the weight of the cellulose ether will be utilized, it being understood that this amount represents only the sulfur dioxide content of the actual compound present. In general, no more than about 0.2% of sulfur dioxide in loosely combined form need be present, and in view of the possibility of corrosion of equipment by sulfur dioxide, no more than this amount will ordinarily be used. In any case, no more than 2% of combined or free sulfur dioxide should be used because of development of objectionable odor and degradation, scorching, etc. in the finished plastic.

Where gaseous sulfur dioxide is used, only a small amount need be passed through the molding composition as absorption of only very small amounts is needed. Where butadiene sulfone is used, 0.2 to 0.5% on the weight of the cellulose ether (equivalent to 0.11% to 0.27% sulfur dioxide) is an optimum quantity, some of the sulfur dioxide being released in milling to form molding powder and the remainder, or some of the remainder being released in molding. However, 0.01% to 2.0% of the sulfone, based on the cellulose ether, may be used. When sodium sulfodioctyl succinate or homologous compound is used, 0.3% to 1.0% of the compound is optimum, although 0.05% to 4.0% may be used. (This represents 0.005% to 0.29% sulfur dioxide based on the cellulose ether.) The amount may be less than in the case of butadiene sulfone, as indicated by the figures, because there is less sulfur dioxide released in milling to form molding powder, and, therefore, relatively more sulfur dioxide available in the molding operation. It will be appreciated that, depending on particular compounds, compositions, and uses, the optimum quantities will vary considerably.

It will be understood that plasticizers, such as dibutyl phthalate, diethyl phthalate, butyl stearate, triphenyl phosphate, tricresyl phosphate, raw castor oil, nonvolatile mineral oils, methyl phthalyl ethyl glycolate, hydrogenated methyl abietate, and the like, may be incorporated with the cellulose ether as usual in the preparation of plastic masses. Likewise, resins, such as the oil-soluble phenol aldehyde condensates, ester gum, hydrogenated glycerol abietate, pentaerythritol abietate, rosin, and oil-modified alkyd resins, would also be included although, as a rule, these substances are not used extensively in plastics intended for molding. Similarly, waxes, such as paraffin, microcrystalline petroleum waxes, carnauba wax, candelilla wax, montan wax, and Japan wax, may also be included. Pigments, dyes, and fillers may also be included.

The method in accordance with this invention includes shaping with the aid of heat by any mechanical modification. Thus, shaping may be by compression molding under heat, injection molding, or by extrusion, drawing, and the like. Temperatures may vary from 100° to 300° C. The invention is particularly valuable in permitting molding at the relatively high but efficient and frequently necessary temperatures of the order of 190–250° C.

It will be appreciated that the compositions in accordance with this invention are also useful where heat is not essential for shaping but where a composition may be subjected to relatively high temperatures or to moderately high temperatures for long periods of time. Thus, the compositions retain good color and stability over long periods of exposure to heat and light in the form of lacquer films, electrical insulation, impregnated and coated fabric, and in film or sheeting.

It has been found that the compositions in accordance with this invention can be molded at quite high temperatures without the formation of rather dark color as normally encountered with cellulose ethers. The compositions are also stabilized against degradation in the form of severe viscosity drop. Stability of this nature preserves toughness. Furthermore, the compositions are capable of withstanding ultraviolet light of the type encountered in exposure to sunlight and sun lamps for long periods without development of dark spots, discoloration, and other degradation. The invention permits the preparation of clear and pastel shades in thermally molded cellulose ether compositions.

Viscosities given throughout this specification are defined in terms of centipoises as determined on 5% solutions of the cellulose ether in 80:20 toluene:alcohol at 25° C. The per cent viscosity retentions were calculated by determining the viscosities of a given sample before and after treatment, such as heat-treatment, and dividing the latter by the former.

The S-1 sun lamp-fog box cycle is fully described in the Government publication dated January 24, 1944, and entitled "Federal Specification for Plastics, Organic—General Specifications—Test Methods" under test LP406a. The cycle includes exposure in a fog chamber for two hours, two hours additional exposure in the fog chamber, followed by eighteen hours irradiation. The cycle may be repeated any number of times.

What we claim and desire to protect by Letters Patent is:

1. A stabilized cellulose ether composition comprising a thermoplastic cellulose ether and from about 0.5% to about 5% of di-sec-amylphenol having the secondary amyl groups substituted in the ortho and para positions relative to the hydroxyl group, said composition being stabilized with respect to viscosity and color during and after exposure to heat, light, oxidation, and weathering by virtue of the presence therein of said di-sec-amylphenol.

2. A stabilized cellulose ether composition comprising a thermoplastic ethyl cellulose and from about 0.5% to about 5% of di-sec-amylphenol having the secondary amyl groups substituted in the ortho and para positions relative to the hydroxyl group, said composition being stabilized with respect to viscosity and color during and after exposure to heat, light, oxidation, and weathering by virtue of the presence therein of said di-sec-amylphenol.

3. A stabilized cellulose ether composition comprising a thermoplastic cellulose ether, a sulfur dioxide-producing compound which is substantially colorless, which does not discolor under heat, which does not in itself function as an acid stronger than sulfurous acid and which releases sulfur dioxide at 200° C., in an amount at least about 0.005% and not more than 2% of the weight of the cellulose ether on the basis of the content of combined sulfur dioxide, and from about 0.5% to about 5% of di-sec-amylphenol having the secondary amyl groups substituted in the ortho and para positions relative to the hydroxyl group, said composition being stabilized with respect to viscosity and color during and after exposure to heat, light, oxidation, and weathering by virtue of the presence therein of said di-sec-amylphenol and said sulfur dioxide-releasing compound.

4. A stabilized cellulose ether composition comprising a thermoplastic cellulose ether, a sulfur dioxide-producing compound which is substantially colorless, which does not discolor under heat, which does not in itself function as an acid stronger than sulfurous acid and which releases sulfur dioxide at 200° C., in an amount between about 0.005% and about 0.5% of the weight of the cellulose ether on the basis of the content of combined sulfur dioxide, and from about 0.5% to about 5% of di-sec-amylphenol having the secondary amyl groups substituted in the ortho and para positions relative to the hydroxyl group, said composition being stabilized with respect to viscosity and color during and after exposure to heat, light, oxidation, and weathering by virtue of the presence therein of said di-sec-amylphenol and said sulfur dioxide-releasing compound.

5. A stabilized cellulose ether composition comprising a thermoplastic ethyl cellulose, an aliphatic diene sulfone which is substantially colorless, which does not discolor under heat, which does not in itself function as an acid stronger than sulfurous acid and which releases sulfur dioxide at 200° C., in an amount between about 0.005% and about 0.5% of the weight of the ethyl cellulose on the basis of the content of combined sulfur dioxide, and from about 0.5% to about 5% of di-sec-amylphenol having the secondary amyl groups substituted in the ortho and para positions relative to the hydroxyl group, said composition being stabilized with respect to viscosity and color during and after exposure to heat, light, oxidation, and weathering by virtue of the presence therein of said di-sec-amylphenol and said sulfur dioxide-releasing compound.

6. A stabilized cellulose ether composition comprising a thermoplastic ethyl cellulose, butadiene sulfone in an amount between about 0.01% and about 2.0% of the weight of the ethyl cellulose, and from about 0.5% to about 5% of di-sec-amylphenol having the secondary amyl groups substituted in the ortho and para positions relative to the hydroxyl group, said composition being stabilized with respect to viscosity and color during and after exposure to heat, light, oxidation, and weathering by virtue of the presence therein of said di-sec-amylphenol and said butadiene sulfone.

7. A stabilized cellulose ether composition comprising a thermoplastic ethyl cellulose, a sulfodialkyl succinate which is substantially colorless, which does not discolor under heat, which does not in itself function as an acid stronger than sulfurous acid and which releases sulfur dioxide at 200° C., in an amount between about 0.005% and about 0.29% of the weight of the ethyl cellulose on the basis of the content of combined sulfur dioxide, and from about 0.5% to about 5% of di-sec-amylphenol having the secondary amyl groups substituted in the ortho and para positions relative to the hydroxyl group, said composition being stabilized with respect to viscosity and color during and after exposure to heat, light, oxidation, and weathering by virtue of the presence therein of said di-sec-amylphenol and said sulfur dioxide-releasing compound.

8. A stabilized cellulose ether composition comprising a thermoplastic ethyl cellulose, sodium sulfodioctyl succinate in an amount between about 0.05% and about 4.0% of the weight of the ethyl cellulose, and from about 0.5% to about 5% of di-sec-amylphenol having the secondary amyl groups substituted in the ortho and para positions relative to the hydroxyl group, said composition being stabilized with respect to viscosity and color during and after exposure to heat, light, oxidation, and weathering by virtue of the presence therein of said di-sec-amylphenol and said sodium sulfodioctyl succinate.

9. A stabilized cellulose ether composition comprising a thermoplastic ethyl cellulose, an organic sulfite which is substantially colorless, which does not discolor under heat, which does not in itself function as an acid stronger than sulfurous acid and which releases sulfur dioxide at 200° C., in an amount between about 0.005% and about 0.5% of the weight of the ethyl cellulose on the basis of the content of combined sulfur dioxide, and from about 0.5% to about 5% of di-sec-amylphenol having the secondary amyl groups substituted in the ortho and para positions relative to the hydroxyl group, said composition being stabilized with respect to viscosity and color during and after exposure to heat, light, oxidation, and weathering by virtue of the presence therein of said di-sec-amylphenol and said sulfur dioxide-releasing compound.

10. A stabilized cellulose ether composition comprising a thermoplastic ethyl cellulose, diethyl sulfite in an amount between about 0.005% and about 0.5% of the weight of the ethyl cellulose on the basis of the content of combined sulfur dioxide, and from about 0.5% to about 5% of di-sec-amylphenol having the secondary amyl groups substituted in the ortho and para positions relative to the hydroxyl group, said composition being stabilized with respect to viscosity and color during and after exposure to heat, light, oxidation, and weathering by virtue of the presence therein of said di-sec-amylphenol and said diethyl sulfite.

WILLIAM KOCH.
GEORGE H. PYLE.

REFERENCES CITED

The following references are of record in the file of this patent:

UNITED STATES PATENTS

| Number | Name | Date |
| --- | --- | --- |
| 2,109,593 | Macht | Mar. 1, 1938 |
| 2,275,716 | Bachman | Mar. 10, 1942 |
| 2,354,745 | Dreyfus | Aug. 1, 1944 |
| 2,407,209 | Swan et al. | Sept. 3, 1946 |
| 2,433,008 | Whitaker | Dec. 23, 1947 |
| 2,465,915 | Myles | Mar. 29, 1949 |

FOREIGN PATENTS

| Number | Country | Date |
| --- | --- | --- |
| 741,975 | France | Feb. 24, 1933 |
| 361,341 | Great Britain | Nov. 16, 1931 |

OTHER REFERENCES

Staudinger, "Ber. Der. Deut. Chem. Ges." (1935), p. 458.

Bacher et al., "Rec. des. Trav. Chim. 'des Pay-Bas," (1935), pp. 538 to 544.